United States Patent [19]

Klasco et al.

[11] 4,406,001

[45] Sep. 20, 1983

[54] TIME COMPRESSION/EXPANSION WITH SYNCHRONIZED INDIVIDUAL PITCH CORRECTION OF SEPARATE COMPONENTS

[75] Inventors: Michael A. Klasco, New York; Irwin H. Kornfeld, Brooklyn, both of N.Y.

[73] Assignee: The Variable Speech Control Company ("VSC"), San Francisco, Calif.

[21] Appl. No.: 179,180

[22] Filed: Aug. 18, 1980

[51] Int. Cl.³ .................... H04B 1/66; G11B 31/00
[52] U.S. Cl. ............................. 369/88; 360/8; 369/175; 179/15.55 T
[58] Field of Search ............ 369/86, 88, 91–92, 369/174–175; 179/15.55 R, 15.55 T, 1 SA, 1 SH; 360/8, 25–27

[56] References Cited

U.S. PATENT DOCUMENTS

| | | | |
|---|---|---|---|
| 3,127,476 | 3/1964 | David, Jr. | 179/15.55 T |
| 3,431,356 | 3/1969 | Gopel | 179/1 SH |
| 3,786,195 | 1/1974 | Schiffman | 179/15.55 T |
| 3,828,361 | 8/1974 | Schiffman | 360/25 |
| 3,840,814 | 10/1974 | Schiffman | 328/58 |
| 3,846,827 | 11/1974 | Eppler, Jr. | 360/26 |
| 3,869,708 | 3/1975 | Schiffman | 360/8 |
| 3,906,384 | 9/1975 | Schiffman | 328/165 |
| 3,936,610 | 2/1976 | Schiffman | 179/15.55 T |
| 3,975,763 | 8/1976 | Kitamura | 360/8 |
| 4,241,235 | 12/1980 | McCanney | 179/15.55 T |

Primary Examiner—Raymond F. Cardillo, Jr.
Attorney, Agent, or Firm—Charles E. Pfund

[57] ABSTRACT

A time compression/expansion audio reproduction system of the type that provides pitch correction by repetitive variable time delay achieves improved performance by separating the reproduced signal from a recording into components which are separately delayed. For studio quality reproduction the signal is separated into contiguous frequency bands which are each delayed synchronously and the processing noise in each band is eliminated by filtering each band signal after delay to eliminate high frequency components. Bandpass filtering prior to recombination as well as blanking and amplitude compression and expansion are also disclosed.

15 Claims, 9 Drawing Figures

TIME COMPRESSION/EXPANSION WITH SYNCHRONIZED INDIVIDUAL PITCH CORRECTION OF SEPARATE COMPONENTS

BACKGROUND OF THE INVENTION

Time compression/expansion systems are known in the prior art and in recent years versions employing repetitive variable time delay for pitch correction such as disclosed and claimed in U.S. Pat. No. 3,786,195 have become commercially available. In such systems, time compression refers to the playback of a recording at a speed higher than that at which the original work was recorded in order to complete the playback of the record in a shorter time than was taken for performance of the original work. Under such conditions, a normal record reproducer will produce an output audible signal which has its pitch frequencies transformed by the same factor as the time compression, i.e., the ratio of playback time to original recording time. In order to utilize time compression effectively where the factor is significantly greater than one such that a substantial saving in time is realized, pitch correction has been applied to the signal to return the pitch of the output signal to something approximately the normal pitch of the speaker or singer or other audible material originally recorded. Where approximately the original pitch is restored to the audible signal obtained with time compression it becomes possible to listen to recorded material at twice the speed of its original recording thus using only approximately one-half the time necessary to listen to a given speech, lecture or other recorded material and this speed listening is actually less tiring, if the pitch is properly corrected, than listening to the somewhat slow pace of delivery by the original speaker, for example. Time compression at greater than a factor of two is also possible with such systems although the greater the increase in speed more familiarity with such listening sensation is required for comprehension. Time expansion is actually the opposite of time compression where the record is played back at a slower speed resulting in a reduction of the pitch frequencies obtained from the record and requiring pitch correction which increases the frequencies of the signals obtained from the slowly played record to restore them to approximately normal frequency. Time expansion is useful where difficult material is being absorbed by the listener such as foreign language learning and other situations where comprehension of the text may be difficult or impaired by natural reasons. In the present invention, time compression/expansion is considered a generic term as involving compression or expansion or both within the capability of a given apparatus as disclosed or claimed.

As described in considerable detail in U.S. Pat. No. 3,786,195, when repetitive variable time delay is used for pitch correction special measures are usually required to compensate for the discontinuity which occurs when the variable delay repeats. Thus filtering, blanking and gap filling with other signal components are suggested for use either alone or in combination in that patent. More sophisticated techniques for processing the signal including the discontinuity are found in U.S. Pat. Nos. 3,828,361; 3,846,827; and 3,869,708. While the techniques shown in these prior art patents produce very high quality audio reproduction at altered speeds with pitch correction, the complete elimination of the switching transient and the filling of the gap left by clearing and refilling the delay medium in certain forms of delay devices can result in still audible vestiges of the interfering transient signal. For extremely high quality record reproduction such as that required for radio and television broadcasting, for example, it is essential that the audio noise components be reduced to the level where they are imperceptible to the untrained ear. This quality is particularly required where the program material includes commercial messages which are presented on commercial radio and television broadcast stations at extremely high cost to the sponsor of the commercial message who thus will accept nothing short of perfection in the end product. On the other hand, the broadcast station is faced with the problem of presenting a pre-recorded message precisely within the interval of a predetermined time slot which is built into the recorded program material. If the recorded commercial message can be expanded or compressed exactly to fit the predetermined time slot the production and programming chores for network and studio broadcasting would be greatly simplified.

SUMMARY OF THE INVENTION

The present invention is related to extremely high quality audio time compression/expansion systems wherein record reproduction can be selected to occupy a time difference other than that at which the original work was recorded to meet various needs such as speed listening or slow learning and further to adapt recorded messages to predetermined time intervals in which the ultimate audio output of the system presents the original recorded material at any desired pitch frequency such as a frequency that approximates or equals the frequencies of the voice or musical instrument which performed the original work which was recorded. The invention further pertains to processing separate components of a signal representing a recorded work, such as the playback of a stereo recording, with the provision for pitch corrected compression or expansion while maintaining time and phase coincidence for the components of the separate stereo tracks.

According to the present invention quality time compression/expansion systems are provided by separately treating the components parts of an electric signal derived from playback of a recording, such as the separate tracks of a stereo recording, or by the subdivision of the electric signal into frequency bands for separately processing two or more frequency bands of the signal representing the recorded work. These frequency bands are preferably contiguous such that the entire frequency spectrum of the electrical signal is processed for pitch correction and to assure time and phase coincidence the periodic delay variations for the subdivided bands are synchronized such that the delay introduced for each band is equal and the variation progresses equally such that the outputs of the delay devices for each band can be combined to reconstitute the complete signal after pitch correction without time or phase distortion between the bands. Further improvement can be obtained by amplitude compression prior to signal delay in each band with corresponding amplitude expansion in each band after delay and prior to summing the signals to obtain the composite output. Since the frequency band occupied by the electric signal obtained from the recording depends upon the time compression or expansion currently selected, the subdivision of the signal into contiguous frequency bands can be enhanced by having variable bandpass filters adjusted in accordance with the motor speed control for the playback device which in turn is coordinated with the required variable delay rate to obtain the desired pitch correction.

Subdivision into frequency bands permits further improvement in signal processing for time compression/expansion in that the length of the delay line required for each band can be optimized. In other words, for a bucket brigade delay line, for example, the number of stages in the shift register delay for the higher frequencies can be increased to provide an optimum number of samples for the higher frequencies while the delay can be synchronized with the lower frequency bands which have fewer stages by a corresponding adjustment in the clock rate within the different bands.

Further improvement in processing can be obtained with band splitting by utilizing lowpass filtering after the pitch correction delay has been effected. Such filtering eliminates switching transients and other processing noise while passing the pitch corrected information signal such that subsequent bandpass filtering operates on the delayed band signals prior to recombination without cross modulation from the higher frequency switching components and other transients.

In accordance with the teaching of of the aforementioned U.S. Pat. No. 3,786,195, the present invention provides for blanking by switching the output channel at the reset time for the delay lines in a analog shift register-type delay system. However, because of the improvements provided by the present invention with band splitting and lowpass filtering after the signals have been delayed, the present invention is capable of providing high quality output without blanking. The associated transients involved in switching the signal to fill the gap present when the signal channels are blanked are thus not present.

The present invention further enhances the quality of time compression/expansion signal processing by utilizing amplitude compression prior to time delay with corresponding amplitude expansion of the fully processed and filtered signal prior to recombination of the multiple bands.

Accordingly, it is the primary object of the present invention to provide high quality time compression/expansion signal processing with low level distortion and switching transients such that the fully processed audio signal is suitable for broadcast quality use or studio composite assembly of finished programming with variable time components.

DESCRIPTION OF THE PREFERRED EMBODIMENTS

Figure 1:
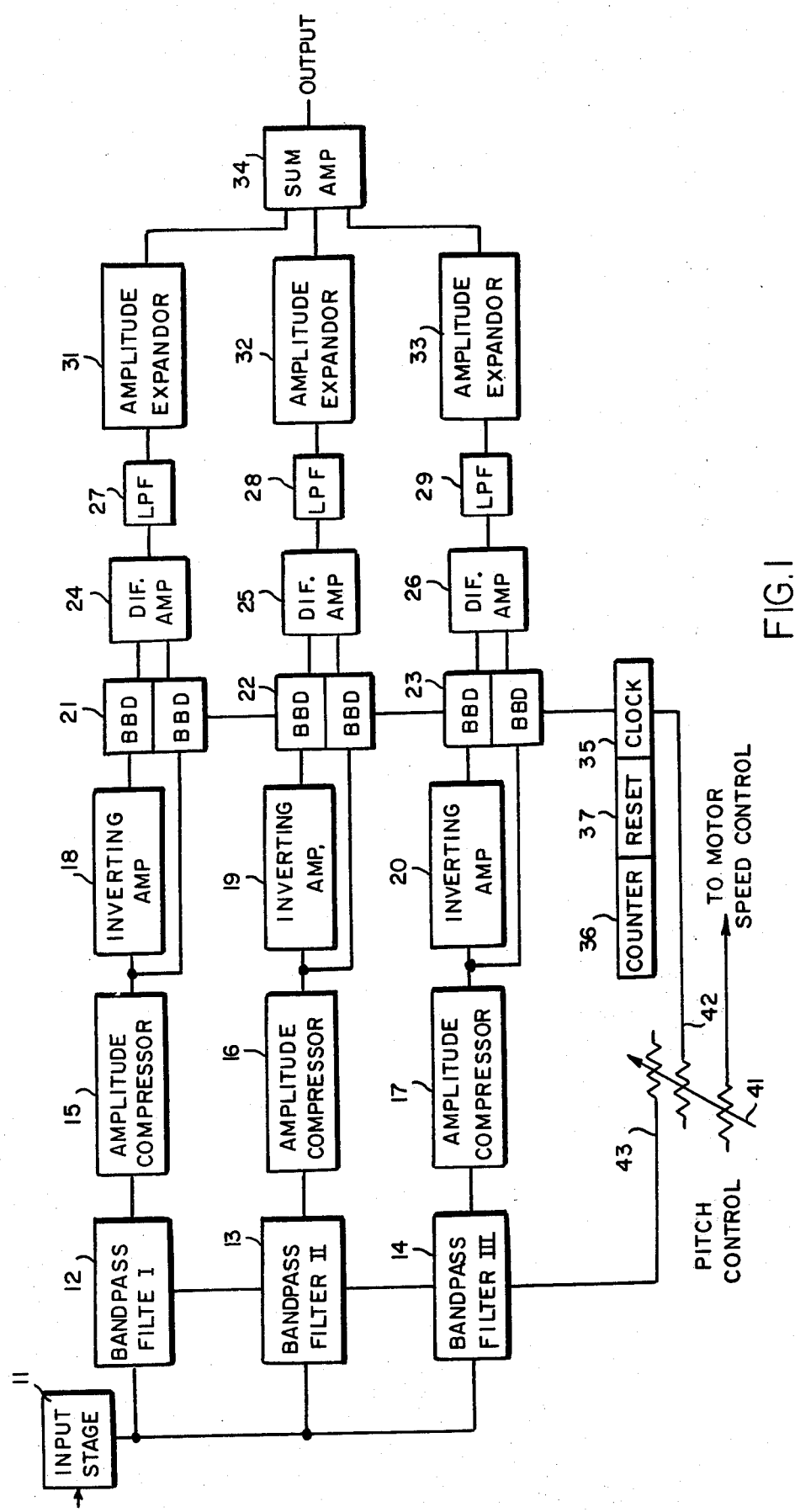
FIG. 1 is a block diagram showing a single channel plural band time compression/expansion system in accordance with the present invention.

In FIG. 1 a source of signal from a playback of a recording or other source is applied to an input stage 11, the output of which is applied to three bandpass filters 12, 13 and 14. Preferably the filters 12, 13 and 14 have continguous passbands to subdivide the audio signal from input stage 11, to include all the desirable signal frequencies and exclude frequencies outside the signal range which are not useful in the particular application for the sytem or use to which the apparatus is adapted. For high quality reproduction the overall passband of the filters 12, 13 and 14 will be the full audio range whereas for a limited quality reproduction or other special applications a narrower band can be used.

The individual frequency bands from the filters 12, 13 and 14 can be applied, if desired, to individual amplitude compressors 15, 16 and 17. Amplitude compression is useful with certain type delay devices to limit the dynamic range of the signal samples and avoid overload problems. The output of the amplitude compressors is applied directly and through inverting amplifiers 18, 19, 20, to matched pairs of bucket brigade device analog shift registers 21, 22 and 23. The outputs of the bucket brigade delay devices 21, 22 and 23 are applied to differential amplifiers 24, 25 and 26 respectively. The technique for inverting the signal to be delayed prior to application to similar delay devices followed by application of the delay signals to a differential amplifier for the purpose of cancelling processing noise is described in U.S. Pat. No. 3,906,384 and its application for time compression/expansion systems is disclosed in U.S. Pat. No. 3,846,827.

The outputs of differential amplifiers 24, 25 and 26 are applied respectively to lowpass filters 27, 28 and 29 which are arranged with their cutoff frequencies to pass their respective frequency band after pitch correction but to exclude the next higher frequency band. With this arrangement the lowpass filters also exclude the higher frequency components of the processing noise and switching transients to an extent that satisfactory aural reception of the ultimate signal is obtained. As described in the prior art particularly U.S. Pat. Nos. 3,786,195 and 3,846,827, previously cited, it would be possible to utilize blanking and gapfilling switching at the location of lowpass filters 27, 28 and 29 either with or without the lowpass filtering.

The outputs of the lowpass filters are applied to amplitude expanders 31, 32 and 33 respectively where the amplitude compression introduced by compressors 15, 16 and 17 is restored to reconstitute the amplitude character of the signals. The outputs of the amplitude expanders is applied to a summing amplifier 34 which combines the pitch corrected different frequency band signals into a composite output signal representing the original recorded work occupying different time duration but with pitch correction to approximate the original frequencies of the work as it was performed for recording.

The swept pulsing of the analog shift register devices 21, 22 and 23 with a variable pulse period to provide progressive delay between samples and thus obtain pitch correction for the signal passing therethrough is described in detail in U.S. Pat. No. 3,786,195. In accordance with the present invention the bucket brigade delay pairs 21, 22 and 23 are all swept with a synchronized signal from clock 35 which applies a variable pulse period swept clock pulse sequence which is reset after a predetermined count by counter 36 which applies a reset signal to the clock 35 from the reset pulse generator 37. Details as to the length of delay, the rate at which the delay is varied and the generation of variable pulse swept signals are described in the previously cited patents with the linearly varying period for the pulses being further described in U.S. Pat. No. 3,840,814.

For the purpose of adjusting the time duration of a given recording, a motor speed control 41 is provided which controls the speed at which the recording is played back. To synchronize the motor speed control and the corresponding pitch change which the electric signal derived from playing the recording at a different than recorded speed entails, the swept period of clock 35 is controlled from control 41 via line 42 to obtain a corresponding pitch correction which compensates for the selected motor speed for playback. Since the change in motor speed for playback of the recording changes the frequencies of the electric signals derived therefrom a synchronized control line 43 for the bandpass filters 12, 13 and 14 is also provided to adapt the overall passsband and the individual passbands of filters 12, 13 and 14 to fit the actual band of the signal derived from the recording.

Figure 2:
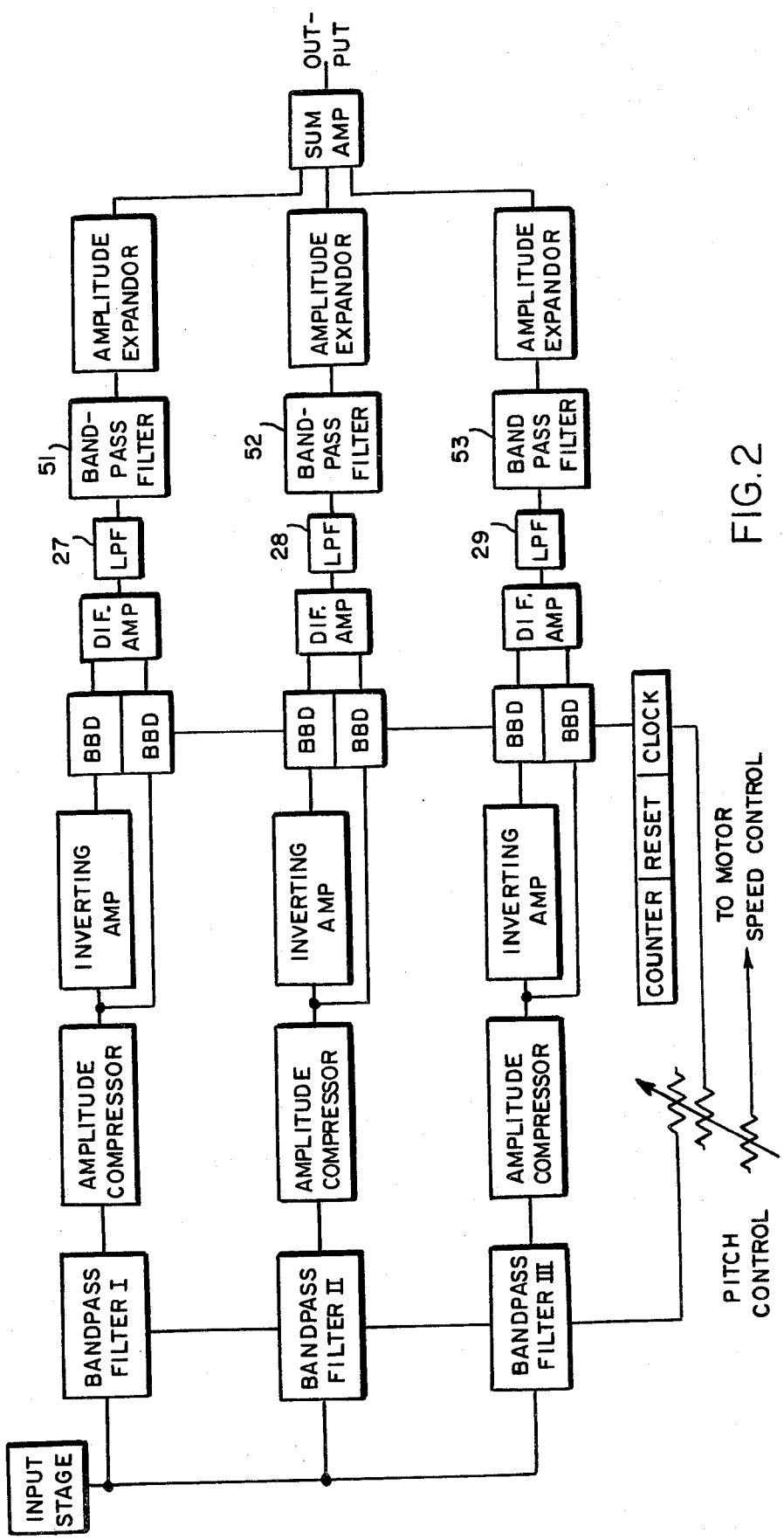
FIG. 2 is a block diagram of a modification of the system shown in FIG. 1.

FIG. 2 shows a system in all respects similar to FIG. 1 except that the outputs of the lowpass filters 27, 28 and 29 are applied through further bandpass filters 51, 52, 53 respectively. Since the restored pitch frequency after delay will generally correspond to normal speech or music the bandpass filters 51, 52 and 53 do not generally need to be modified with change in the pitch control 41 since they receive relatively constant band frequencies irrespective of the pitch correction adjustment and motor speed control adjustment.

Figure 3:
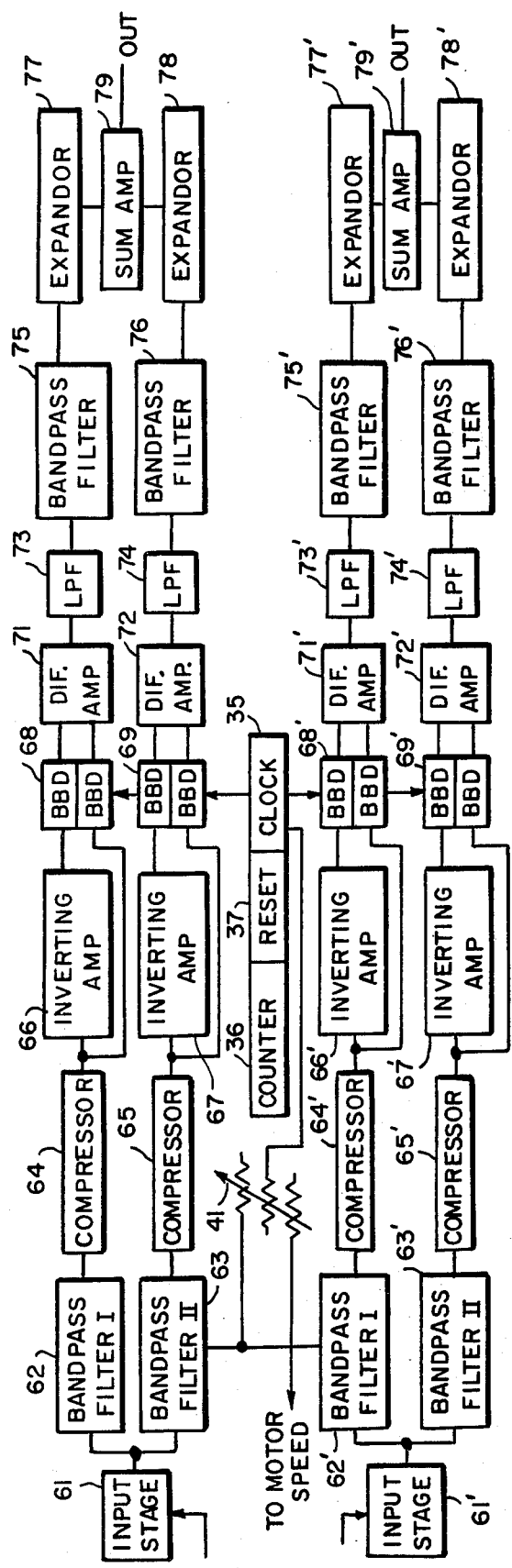
FIG. 3 is a block diagram of a dual channel plural band system employing time compression/expansion in accordance with the invention.

FIG. 3 shows a dual channel band splitting time compression/expansion system wherein two or more signal channels are processed synchronously. A first channel input signal is applied to an input stage 61 is split into two bands by bandpass filter 62 and 63. The outputs of these bandpass filters are amplitude compressed in compressors 64, 65, the output of which is applied directly and through inverting amplifiers 66 and 67 to the input of analog shift register bucket brigade delay devices 68 and 69 which operate as pairs on the direct and inverted audio signal as previously described. The outputs of the pairs of delay lines 68 and 69 are differentially combined in differential amplifiers 71 and 72, the output of which is applied respectively to lowpass filters 73 and 74. The output of the lowpass filters are applied to bandpass filters 75, 76, the outputs of which are amplitude expanded in expandors 77, 78, with the expanded signals summed in summing amplifier 79 to produce a composite output of the pitch corrected signal for channel 1. The signal processing involved for channel 1 from input stage 61 to summing amplifier 79 corresponds substantially identically with that described for FIG. 1 except that the bandsplitting is confined to two frequency bands instead of three.

The second channel is identical with the first channel and constitutes elements which have corresponding numbers primed functioning in the same way as described in channel 1. Thus input stage 61' has the channel 2 signal subdivided into two frequency bands by bandpass filters 62' and 63'. Corresponding elements process these frequency separated signals for pitch correction and filtering until the band separated signals in channel 2 are combined in summing amplifier 79'. Thus channel 1 and channel 2 are separately available at the output terminals of summing amplifiers 79 and 79' respectively.

The paired analog shift registers 68, 69 and 68' and 69' in the two channels are all driven in synchronism by a common clock 35 operating in conjunction with a counter 36 and reset 37 to provide the repetitive linear periodic clock period variation for the delay variation of signal through the bucket brigade delays 68, 69, 68', 69'. As before, a motor speed control 41 may be provided to control the clock rate for the desired pitch correction along with adjustment of the bandpass for bandpass filters 62, 63, 62' and 63'.

Figure 4:
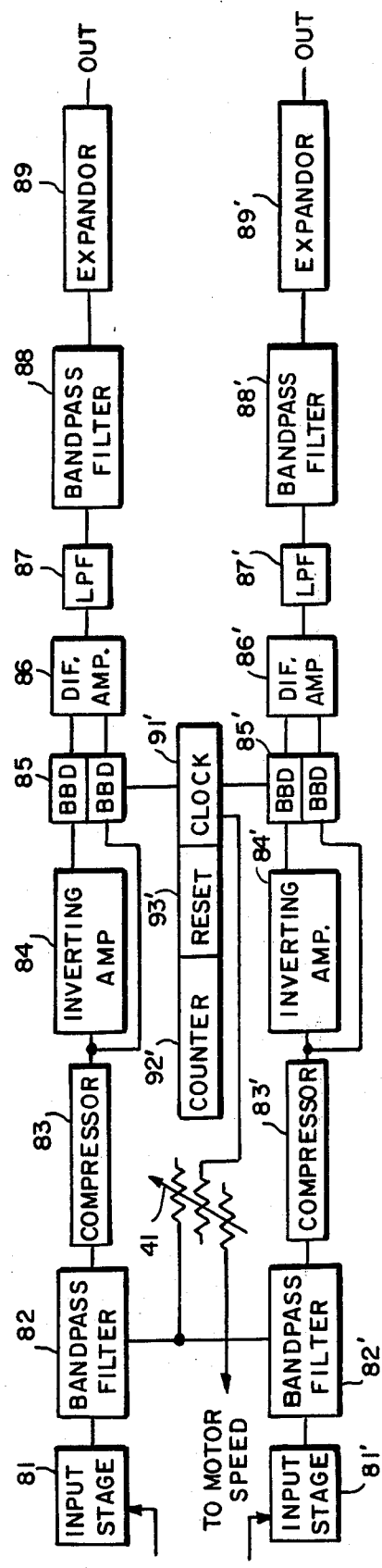
FIG. 4 is a block diagram of a time synchronized dual channel stereo system employing time compression/expansion in accordance with the invention.

Referring to FIG. 4, a modified application of the invention is shown for a conventional two-track stereo system. The two stereo signals are applied respectively to input stage 81 and 82 and processed as single frequency band signals through bandpass filters 82 and 82'. Each channel of the stereo signal is passed respectively through amplitude compressors 83, 83' and directly and through inverting amplifiers 84, 84' to paired bucket brigade delay devices 85, 85', the outputs of which are combined by differential amplifiers 86, 86' and applied to lowpass filters 87, 87'. The pitch corrected signals pass through similar bandpass filters 88, 88' and through amplitude expanders 89, 89' to provide the two channel stereo output signals pitch corrected at the outputs of the expanders 89, 89'.

Again, the paired analog shift registers 85, 85' are operated in synchronism from a common clock 91 which operates in conjunction with a counter 92 and a reset 93 to provide the variable pulse spacing repetitive clock signals for the desired progressive time delay as previously described. The clock and the bandpass filters 82, 82' are operated from a common control 41 which again may be used to control motor speed for the playback device.

The general application of the invention to various systems will be understood from the foregoing description. A detailed description of a particular application of the invention will now be described with reference to composite FIG. 5 made us of FIGS. 5A, 5B, 5C, 5D and 5E assembled as indicated thereon.

Figure 5A:
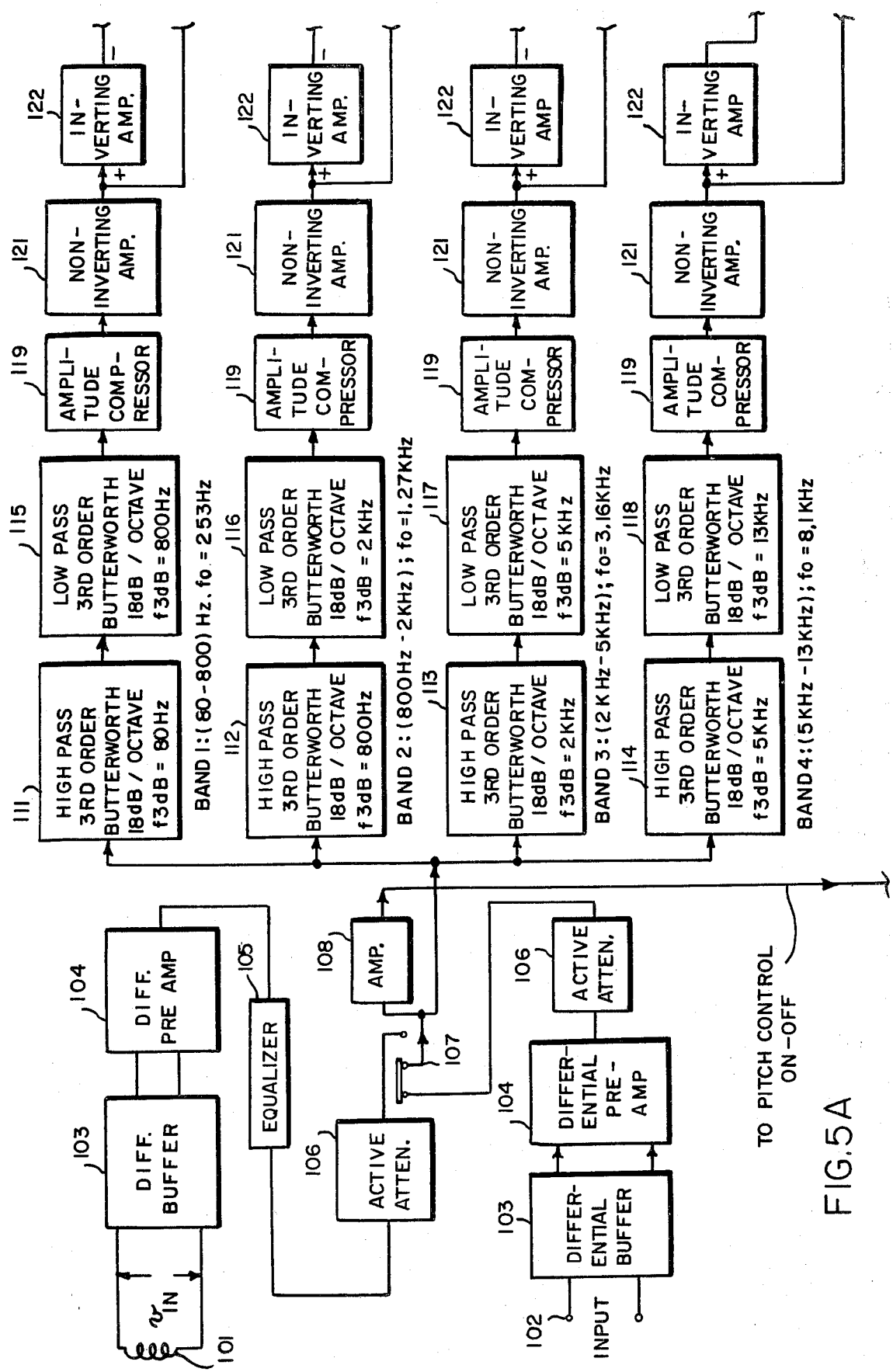
FIGS. 5A, 5B, 5C, 5D and 5E are subdivisions of an overall block diagram of a multiband system incorporating various features of the invention for studio use.
Figure 5B:
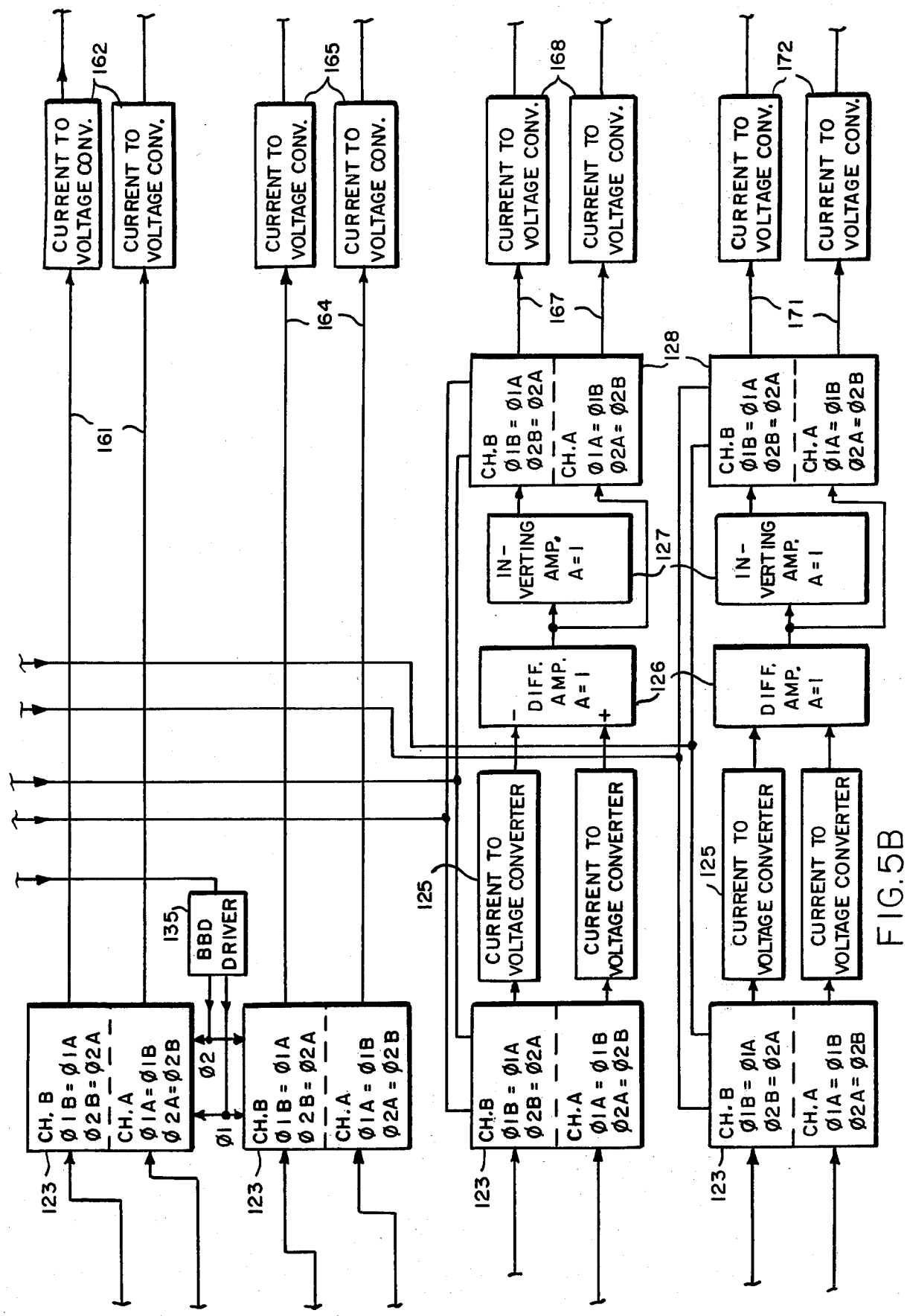
Figure 5C:
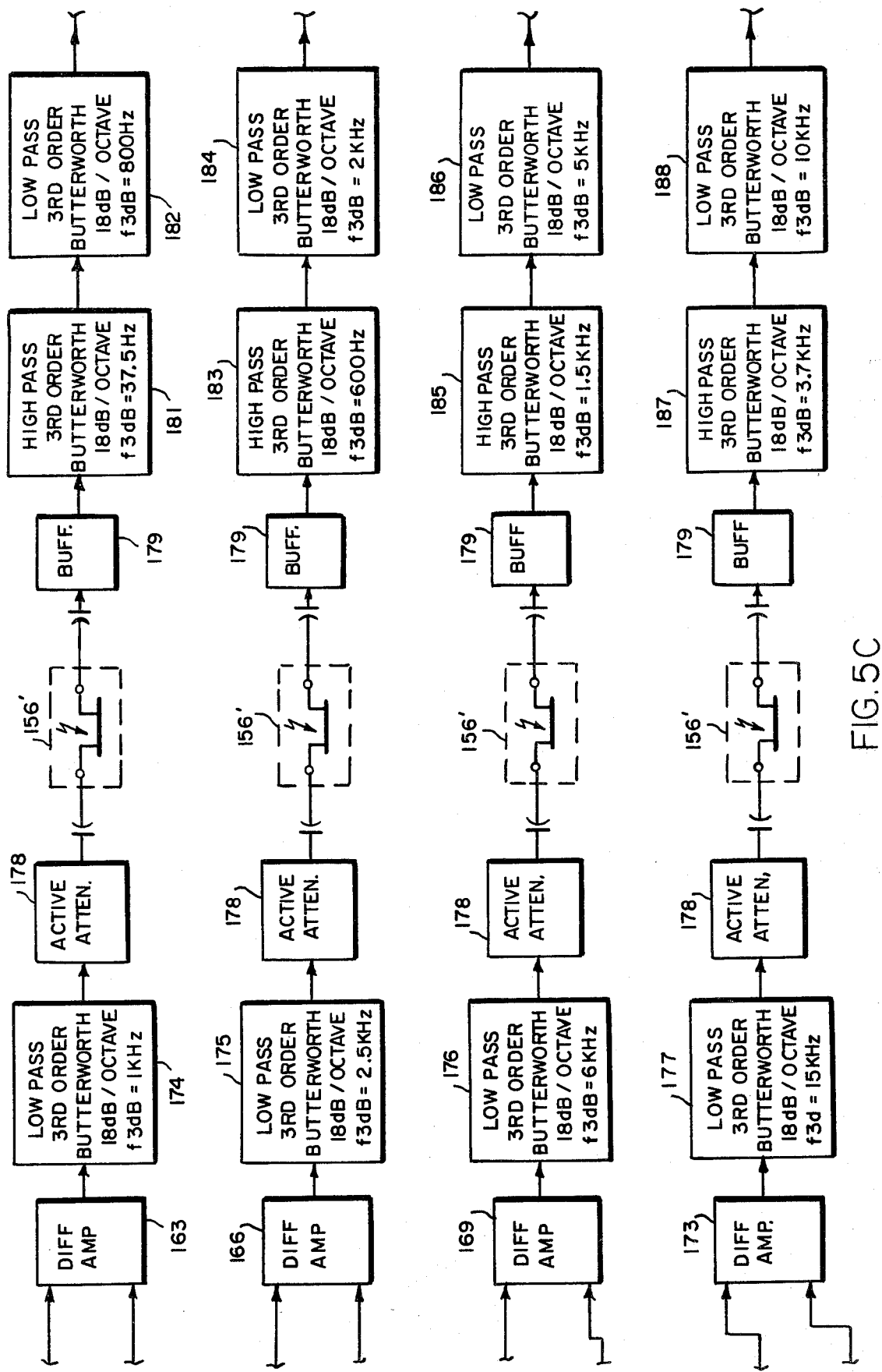
Figure 5D:
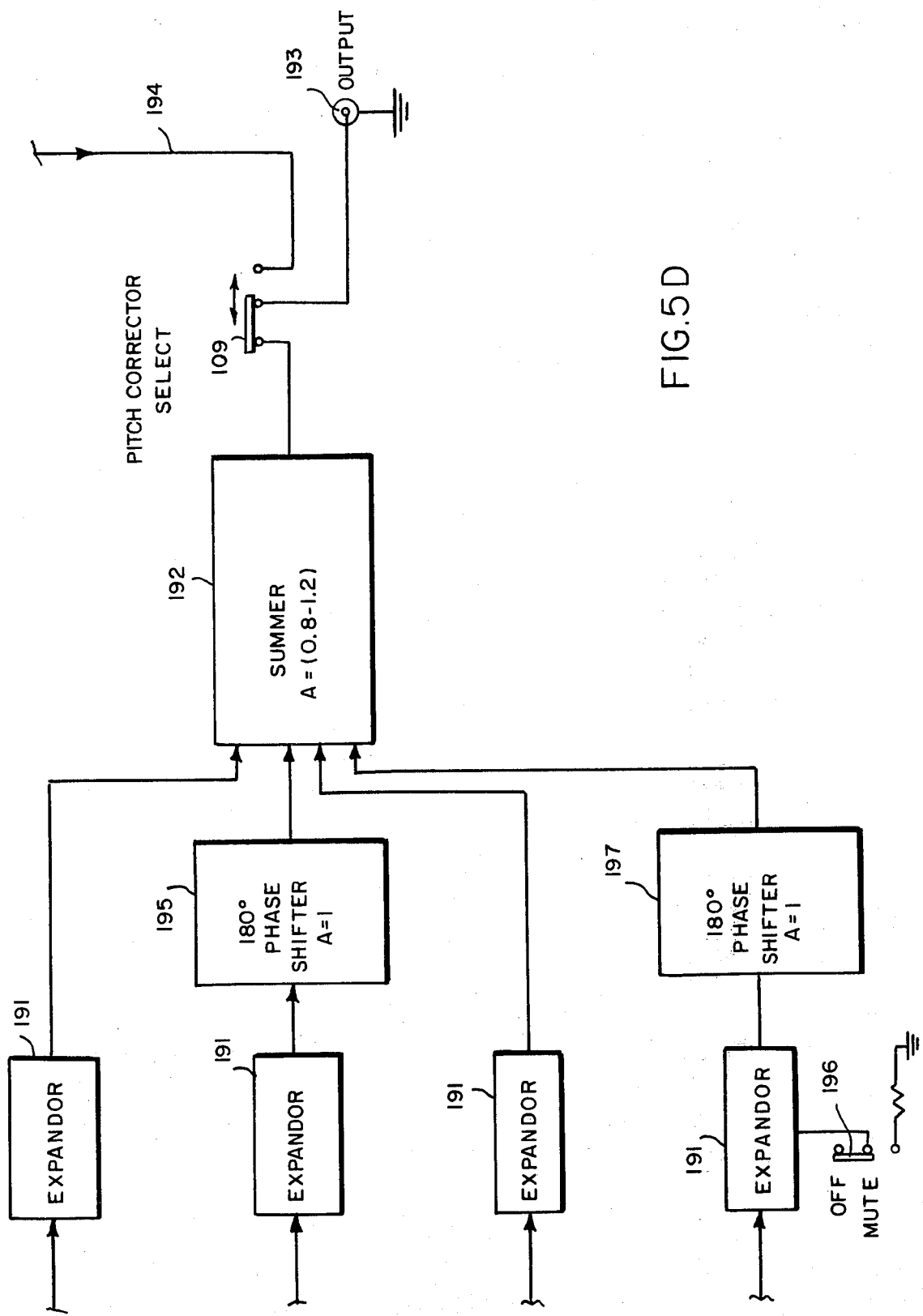
Figure 5E:
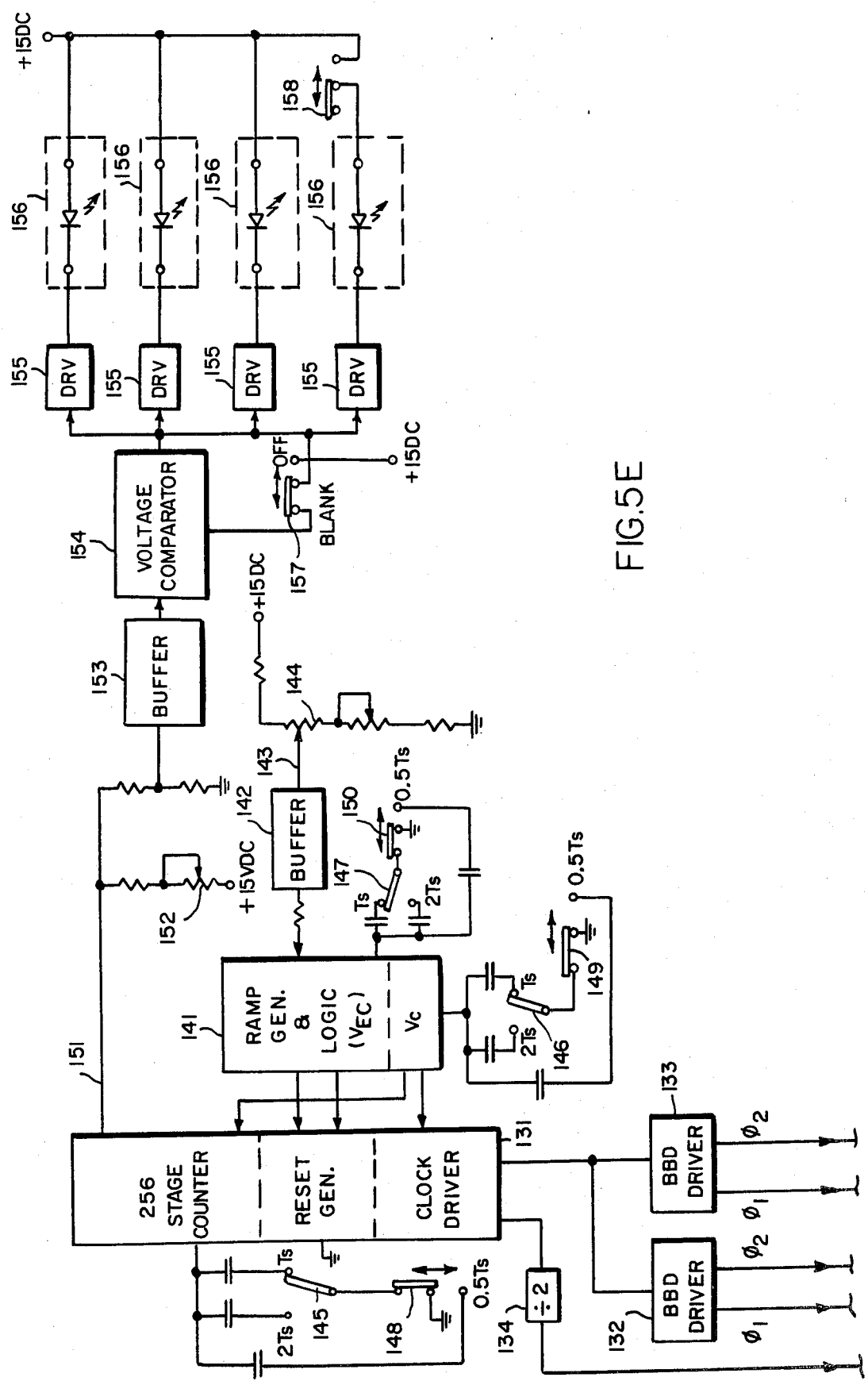

Referring to the assembled FIG. 5, there is shown in FIG. 5A thereof multiple input signal sources such as playback head 101 and input line 102. Each input signal can be processed in a conventional manner such as through differential buffers 103 and differential preamplifiers 104. The signal from playback head 101 may be further processed through an equalizer 105 and in each signal channel the signal is subjected to an active attenuator 106 to provide a standardized signal level for further processing. The plural input signals are selectively available by connecting the output of the active attenuators 106 to switch 107 which selects either signal source to derive the signal for further processing. The signal selected by switch 107 is passed through an amplifier 108, the output of which is selected by a pitch correction on/off switch 109 for direct use, if desired.

For pitch correction processing the output from switch 107 is applied directly to four highpass filters 111, 112, 113 and 114. These highpass filters form the low frequency cutoff characteristic for bandpass filtering of the input signal and operate in conjunction with a set of lowpass filters 115, 116, 117 and 118 which form the high frequency cutoff characteristic for the bandpass filters. In each instance the highpass and lowpass filters are designed as third order Butterworth filters with an 18 db per octive roll-off with a 3 db frequency located as indicated in the individual filters on FIG. 5A. Thus filter 111 has its 3 DB frequency of 80 Hz, while the lowpass filter 115 for that channel has its 3 DB frequency at 800 Hz. These two filters 111 and 115 define a passband for band No. 1 of 80 to 800 Hz with a center frequency $f_o$ at 253 Hz. Similarly, for the other three passbands the design criteria for the particular embodiment disclosed in FIG. 5 is shown for band 2 with $f_o$ at 1.27 kHz, band 3 with $f_o$ at 3.16 kHz and band 4 with $f_o$ at 8.1 kHz. The 3 db cutoff points for the filter characteristics for each of these bands are indicated in FIG. 5A; the high and low 3 db frequency points for band 2 being 800 Hz and 2 kHz, for band 3 2 kHz to 5 kHz and for band for 5 kHz to 13 kHz.

If desired the output from the bandpass filters can be amplitude compressed by a set of separate amplitude compressors 119 introduced in each band. The amplitude of the output signal from the amplitude compressor can be standardized through noninverting amplifiers 121 for each channel, the output of which is applied directly and, after inversion in inverting amplifiers 122, to the paired analog shift register bucket brigade delay lines 123. Up to the first bank of bucket brigade delay lines 123 the signal processing in each channel has been identical except for the band splitting provided by the different frequency ranges for the bandpass filters of bands 1, 2, 3 and 4.

A feature of the invention provides for increasing the number of stages of shift register delay for the higher frequency channels. For this purpose the outputs of bucket brigade delays 123 in bands 3 and 4 are applied to current to voltage converters 125, the outputs of which for each band are applied to differential amplifiers 126. The outputs of the differential amplifiers 126 are the reconstituted total signal for bands 3 and 4 respectively and these signals are again applied directly and through inverting amplifiers 127 to matched pairs of bucket brigade delay devices 128. The signals emerging from the delay devices 128 for bands 3 and 4 thus have passed through twice as many delay stages as the corresponding output signals from the pairs of delay devices 123 use to delay the signals in bands 1 and 2. In order for the signal in each band to experience the same time delay, the delay shift registers 123 and 128 for bands 3 and 4 are clocked at twice the clock rate of the delay registers 123 for bands 1 and 2. This difference in clock rate is accomplished by deriving the basic clock frequencies for bands 3 and 4 from clock driver 131 which clock rate is applied to separate bucket brigade delay drivers 132 and 133. The driver 132 drives the BBD delay devices 123 and 128 for channel 3 and the driver 133 applies driving clock pulses to the BBD delays 123 and 128 for channel 4. The same clock frequency is divided by two in divider 134 and this half frequency clock pulse train is applied through BBD driver 135 to clock the BBD delays 123 in channels 1 and 2. As indicated, the BBD drivers apply opposed phase square driving pulses ∅1 and ∅2 to the BBD delay lines as the conventional form of clocking for the particular devices.

The derivation of the ramp control signals and the phased pulses to provide desired pitch change timing to the driver's 132 and 135 is achieved from a circuit 141 of the type described in detail in U.S. Pat. No. 3,846,827. In particular, FIG. 1 of that patent shows drivers 65 for the BBD delays 68, 69, timed by a counter 81 and reset generator 52, designated "chip 2" in that patent. This combination corresponds generally with the circuit 131 shown in FIG. 5E comprising the 256 stage counter, reset generator and clock driver. The elements of circuit 131 are controlled by the ramp generator and logic for producing $V_c$, the voltage controlled period waveform for the clock drivers from a circuit 141 which corresponds generally with "chip 1" shown in FIG. 1 of U.S. Pat. No. 3,846,827. The ramp control signal is applied from a buffer 142 which has the pitch selection control input signal applied thereto from line 143 in the form of a DC control votage selected as the variable contact point on a voltage divider 144.

For high quality time compression/expansion the present invention provides for selection of the relative length of both the reproduced portion of the signal and the gap discard interval controlled in coordination by a set of gang switches 145, 146 and 147. Each of these switches provides two positions for segment timing $T_s$ or $2T_s$. Each of the switch contacts 145, 146 and 147 is connected respectively through slide switches 148, 149 and 150 which selects a time interval 0.5 $T_s$. $T_s$ is defined as to time interval for the variable delay period and equals the portion of the signal which is utilized plus the discarded portion which is discarded as the ramp voltage control reverses to reset for the next delay sweep. A typical value for $T_s$ is 175 ms which, for C=1.15, would result in a "keep interval" of 153 ms and a "discard interval" of 22 ms. The resulting time reduction would be 13.1%.

The adjustment of the timing is accomplished by changing the time constants for the ramp generator, the reset generator and the counter circuits of the chip 1 and chip 2 circuits of U.S. Pat. No. 3,846,827. For this purpose the switches 145, 146, 147 are ganged to operate together between either the $T_s$ or the $2T_s$ position and the switches 148, 149 and 150 are ganged together to select the 0.5$T_s$ position. For any selected segment duration interval the capacitors selected by the switches 147 and 150 control the time duration of the ramp generated by ramp generator 141. The slope of the ramp to provide the proper pitch change is controlled by the voltage applied to the ramp generator selected from the potentiometer 144 at variable contact line 143, as previously described. When the duration of the ramp is selected by selecting one of the segment duration values using switch 147 and 150 a further control on the ramp generation is provided by the switches 147 and 150 to control the reset time by establishing the maximum excursion of the ramp thereby to control the maximum and minimum values for the progressively changing clock frequency. A similar set of capacitors controls the portion of the segment which initiates the gap or discard by means of the setting of switches 145 and 148 to control the 256 stage counter in unit 131. Thus the segment duration selection by means of switches 146, 149, the ramp excursion set by switches 147, 150 and the counter output to control reset selected by the switches 145, 148 may be adjusted to optimize these parameters for any given program material. For example, where a video recorded commercial insert is adapted to fit a particular time slot on broadcast television the video tape can be played and the accompanying audio signal modified in pitch to achieve a normal or nearly normal sound. By adjusting the various parameters for the repetitive delay function a particular setting can be found which has the minimum noise artifacts or other annoying signal components due to the repetitive and blanking functions of the system. When the optimum parameters have been selected for a given time change for a given playback video recording the audio track can be rerecorded using the system of the present invention so that the commercial message can be played with a completely normal sounding and noise-free audio message.

The blanking signal generated from the output of the 256 stage counter in unit 131 is converted into an RC timing waveform by adjusting the resistance with variable resistor 152. This waveform provides the blanking timing signal for controlling the interval during which blanking is applied if the system is conditioned to provide blanking as hereinafter described.

The blanking timing signal on line 151 is applied through a buffer 153 to a voltage comparator 154 which produces a timed output pulse at a predetermined voltage comparison condition which is applied to a gallium arsenide infrared emitting diode (i.e., photo coupled) drivers 155, each of which controls separate photo coupled light sources 156 to produce a voltage controlled light pulse whenever switch 157 is connected as shown to provide blanking. The other position of switch 157 eliminates blanking by applying plus voltage to block the driver circuits 155. A switch 157 is provided in the plug 15 volt supply for the photo coupled light source 156 to eliminate generation of the blanking light pulse in a given recording being reproduced.

The delayed segment and gap signals from BBD delay lines 123 for band 1 appear on line 161 as current signals which are applied to current to voltage converters 162, the outputs of which drive the opposite polarity inputs of a differential amplifier 163 to recombine the separately delayed phase opposed signals. Similarly, the outputs of the band 2 delay lines 123 appear on lines 164 and are applied to current to voltage converters 165, the outputs of which are applied to the positive and negative inputs of differential amplifier 166.

The higher frequency bands which have been processed through tandem BBD delays 123 and 128 for both bands 3 and 4 are similarly processed. Thus for band 3 the phase opposed delayed signals from the tandem BBD delays 123 and 128 in that band appear on lines 167 and these signals pass through current to voltage converters 168 which have their outputs applied to differential amplifier 169 as previously described for bands 1 and 2. The delayed outputs for band 4 after passing through BBD delays 123 and 128 appear on lines 171 which after current to voltage conversion in converters 172 are applied to the inputs of differential amplifier 173.

The outputs of the differential amplifiers 163, 166, 169 and 173, supply the reconstituted delayed signals for bands 1, 2, 3 and 4 respectively which are applied respectively to lowpass filters 174, 175, 176 and 177. Filter 174 is a third order Butterworth having a roll-off characteristic of 18 db per octave with the 3 db frequency of 1 kHz. The remaining lowpass filters are of similar design with the 3 db frequency points for filter 175 at 2.5 kHz, for filter 176 the 3 db point is at 6 kHz and for filter 177 the 3 db frequency is 15 kHz. These lowpass filters assure for each band that spurious noise and artifact signals above the passband of each respective filter is eliminated. With the previous band separation provided by bandpass filters in each channel, for example highpass filter 111 and lowpass filter 115 for band 1, the addition of the lowpass filters, for example, filter 174 in band 1 is often adequate to provide high quality reproduction without blanking during the gap interval.

Where such is the case the noise artifacts provided by blanking in each channel can be eliminated by positioning blanking switch 157 to the off position whereupon the output signals from lowpass filters 174, 175, 175 and 177 are continuously coupled through the bilateral analog FET portion of the photo coupler normally gated by the photo coupled emitting diode 156. The photodiodes are indicated as 156' in each channel. The output of each of the lowpass filters 174, 175, 176 and 177 is applied respectively to an active attenuator 178 in each channel used to modify the amplitude excursion of the signal to a standardized level before application to the bilateral analog FET 156'.

The outputs of the bilateral analog FETs 156' are applied through buffers 179 in each band before the signals are applied through bandpass filters comprising tandem highpass and lowpass filters. In band 1, a high pass filter 181 is a third order Butterworth with a cutoff characteristic of 18 db octave and a 3 db frequency of 37.5 Hz. The corresponding lowpass filter 182 in band 1 is a lowpass third order Butterworth with a characteristic 18 db per octave roll-off and a 3 db frequency of 800 Hz. Similar pairs of highpass and lowpass third order Butterworth filters are connected in tandem for each band with band 2 having highpass filter 183 and lowpass filter 184 with 3 db frequencies of 600 Hz and 2 kHz respectively. Band 3 has a highpass filter 185 with a 3 db frequency of 1.5 kHZ and a lowpass filter 186 with a 3 db frequency of 5 kHz. Band 4 has a highpass filter 187 with a 3 db frequency of 3.7 kHz and a lowpass filter 188 with a 3 db frequency of 10 kHz.

The outputs of the bandpass filters for bands 1, 2, 3 and 4 are applied to amplitude expanders 191 in each band where the signal is expanded with a characteristic complimentary to the amplitude compression provided by amplitude compressors 119.

The outputs of the expanders 191, if amplitude compression/expansion is employed are summed in a summing circuit 192 to recombine the full band audio signal with pitch correction. The output of the summer is applied through a switch 109 to an output terminal 193. The output 193 also can be connected, as previously described, by throwing switch 109 to line 194 which is directly connected to the output of amplifier 108.

In the low frequency bands 1 and 2 and the high frequency band 3 the bandpass frequency characteristic of the Butterworth filters produces a phase difference of 180° between the adjacent bands. For this reason a phase correction is introduced with 180° phase shifter 195 for the signal in band 2 just prior to summing in the summing amplifier 192. Likewise, a phase correction is introduced with 180° phase shifter 197 for the 180° phase difference between high frequency bands 3 and 4. In addition, the signal in band 4 which has the higher frequencies is sometimes desired to be eliminated. For this purpose a muting switch 196 is provided on expander 191 and band 4 to remove band 4 from the summed output.

As previously described the system of FIG. 5 is ideally suited for adapting the audio portion of recorded messages to fit a particular time slot. A particular application of this technique is found in tailoring commercial messages to fit the preestablished time slot in a recorded TV or radio broadcast program. For this purpose the video tape can be processed running at a speed which will exactly correspond with the alloted time slot and the audio message accompanying the video signal can be analyzed for quality. With the system of FIG. 5 pitch correction can be accomplished and the paramaters adjusted until the audio portion of the signal is essentially noise-free. When this time duration pitch correction and noise-free quality is achieved a rerecording of the audio portion of the tape can be made so that the commercial recording has the exact time duration required and the high quality essential for broadcast use. The resulting audio reproduction is indistinguishable for the ordinary listener from the high quality reproduction of the original recording.

Many applications of the band splitting and channel separation pitch correction techniques disclosed by the present invention will be now apparent to those skilled in the art by processing an audio signal as subdivided frequency bands or a high quality signals such as stereo into its separate channels with the techniques disclosed herein while accomplishing pitch correction in a synchronized manner the resultant oral signal quality after the signals have been recombined for reproduction is extremely high quality and to the ordinary listener completely free of any annoying sounds originating from the signal processing. The invention accordingly should be considered to include those modifications which fall within the scope of the appended claims.

We claim:

1. In a time compression/expansion system in which the playback speed for a record is selected such that the frequencies of electric signals derived from playback of a recorded work are different than their original values and said electric signals are processed to change their frequency by periodic variable time delay the improvement comprising:
   means for deriving from said record a plurality of separate electrical signal components which together represent the composite of the recorded work;
   means for separately processing each of said plural signal components with period variable time delays;
   means for synchronizing said periodic variable time delays for each of said components to obtain time coincidence between corresponding portions of said components after they have been delayed, and
   means for combining the delayed signal components into a composite signal representation of the original work;
   wherein said means for deriving said plurality of separate electrical signal components includes
   means for separating the signals derived from said record into approximately contiguous frequency bands, said bands being said signal components which are separately processed with the same periodic variable time delay.

2. In a time compression/expansion system in which the playback speed for a record is selected such that the frequencies of electric signals derived from playback of a recorded work are different than their original values and said electric signals are processed to change their frequency by periodic variable time delay the improvement comprising
   means for deriving from said record a plurality of separate electrical signal components which together represent the composition of the recorded work;
   means for separately processing each of said plural signal components with periodic variable time delays;
   means for synchronizing said periodic variable time delays for each of said components to obtain time coincidence between corresponding portions of said components after they have been delayed, and
   means for combining the delayed signal components into a composite signal representation of the original work;
   in which said means for deriving from said record a plurality of separate electrical signal components comprises means for deriving the separate channel signals from a stereophonic recording as the components separately processed with said periodic time delay and in which the means for deriving said plurality of separate electrical signal components includes
   means for separating the signals derived from said record into approximately contiguous frequency bands, said bands being said signal components which are separately processed with the same periodic variable time delay.

3. In a time compression/expansion system in which the playback speed for a record is selected such that the frequencies of electric signals derived from playback of a recorded work are different than their original values and said electric signals are processed to change their frequency by periodic variable time delay the improvement comprising
   bandpass filter means responsive to the electric signals derived from said record for producing a plurality of frequency band signals containing the frequency components of said electric signals falling in the respective frequency bands;
   means for separately processing said frequency band signals with periodic variable time delays to change the frequencies of the respective frequency band signals by the same factor;
   means for synchronizing said periodic variable time delays for each of said frequency band signals to obtain time coincidence between corresponding portions of the delayed output signals from said time delays, and
   means for combining said delayed output signals to obtain a composite signal representation of the original work.

4. Apparatus according to claim 3 wherein said bandpass filter means produces a plurality of contiguous frequency band signals.

5. Apparatus according to claim 4 in which said bandpass filter means for each band comprises a high pass third order Butterworth filter having an approximate 18 db per octave roll-off characteristic followed by a low-pass third order Butterworth filter having an approximate 18 db per octave roll-off characteristic.

6. Apparatus according to claim 4 wherein said variable time delays are provided by analog delay shift devices clocked at a progressively changing clock period that varies repetitively between end point values to progressively delay signal samples passing through said devices.

7. Apparatus according to claim 5 wherein said analog delay shift devices for the higher frequency band signals has a number of stages which is a multiple of the number of stages for the lower frequency band and the clock rate for the higher frequency delay device is the same multiple of the clock frequency for the lower frequency delay device.

8. Apparatus according to claim 5 wherein the analog shift delay devices in each band comprise a pair of equal bucket brigade shift registers supplied with the phase opposed input signals in each band to be delayed by being simultaneously clocked through said pair shift registers and the outputs of each said pair are applied to current to voltage converter means, the outputs of which are combined in differential voltage responsive means.

9. Apparatus according to claim 3 wherein said means for combining said delayed output signals includes output bandpass filter means for each of said delayed frequency band signals.

10. Apparatus according to claim 9 and including lowpass filter means for each of said delayed frequency band signals for eliminating any frequency component above the cutoff frquency of the respective lowpass filter characteristic for each band before said delayed output signals are applied to said output bandpass filter means.

11. Apparatus according to claim 10 and including blanking means for each of said delayed output signals for eliminating the output in each channel during a portion of the period of said delay variation.

12. Apparatus according to claim 10 in which each frequency band has a normally enabled signal controlled switch means connected to pass signals between said lowpass filter means and said output bandpass filter means and means responsive to the end of each period of said periodic time delay for disabling said switches for each band for a predetermined time interval.

13. Apparatus according to claim 12 including means for selecting the disabled time interval of said switch means.

14. The method of adjusting the time duration for playback of a recorded work to occupy predetermined interval different than the time taken to perform the original work such that the frequencies of the electrical signal obtained during playback are altered and the altered frequencies are restored by processing with repetitive variable time delay, the improvement comprising the steps of
separating said electrical signal into approximately contiguous frequency bands;
processing each of said frequency bands with the same repetitive variable time delay;
synchronizing the delay variation for each frequency band to obtain time coincidence for corresponding portions of the signals in each band after they have been delayed, and
combining the delayed signals from each band into a composite signal representation of the original work.

15. In a time compression/expansion system for multichannel records in which the playback speed for the record is selected such that the frequencies of electric signals for each channel derived from playback of a recorded work are different than their original values and said electric signals are processed to change their frequency by periodic variable time delay the improvement comprising
means for deriving from said record a separate electrical signal corresponding to each of said channels which together represent the composition of the recorded work;
means for separating said electric signal for each of said channels into a plurality of approximately contiguous frequency band signals;
means for separately processing each of said plurality of frequency band signals with periodic variable time delays for each of said frequency band signals to obtain time coincidence between corresponding portions of said frequency band signals after they have been delayed, and
means for combining the delayed frequency band signals in each said channel into composite signal representations of the original work.

* * * * *